United States Patent
Mori et al.

(10) Patent No.: US 9,935,456 B2
(45) Date of Patent: Apr. 3, 2018

(54) WIRELESS POWER TRANSMISSION DEVICE

(71) Applicant: TOKIN CORPORATION, Sendai-shi, Miyagi (JP)

(72) Inventors: Masashi Mori, Sendai (JP); Yuichi Sakurai, Sendai (JP); Kazumasa Makita, Sendai (JP); Koichi Mishina, Sendai (JP); Junetsu Urata, Sendai (JP); Yuichi Hosokawa, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 148 days.

(21) Appl. No.: 14/652,721

(22) PCT Filed: Mar. 7, 2014

(86) PCT No.: PCT/JP2014/056009
§ 371 (c)(1),
(2) Date: Jun. 16, 2015

(87) PCT Pub. No.: WO2014/156570
PCT Pub. Date: Oct. 2, 2014

(65) Prior Publication Data
US 2016/0020600 A1 Jan. 21, 2016

(30) Foreign Application Priority Data
Mar. 28, 2013 (JP) .................. 2013-067804

(51) Int. Cl.
*H01F 38/14* (2006.01)
*H02J 5/00* (2016.01)
(Continued)

(52) U.S. Cl.
CPC .............. *H02H 7/20* (2013.01); *H02J 5/005* (2013.01); *H02J 7/025* (2013.01); *H02J 17/00* (2013.01);
(Continued)

(58) Field of Classification Search
CPC .. H02H 7/20; H02J 50/10; H02J 50/12; H02J 50/80
See application file for complete search history.

(56) References Cited

U.S. PATENT DOCUMENTS

| 8,421,409 B2 | 4/2013 | Ichikawa |
| 2011/0115303 A1* | 5/2011 | Baarman .................. H02J 17/00 307/104 |

(Continued)

FOREIGN PATENT DOCUMENTS

| JP | 2008206297 A | 9/2008 |
| JP | 2011045045 A | 3/2011 |

(Continued)

OTHER PUBLICATIONS

International Search Report (ISR) dated Apr. 28, 2014 issued in International Application No. PCT/JP2014/056009.
(Continued)

*Primary Examiner* — Jared Fureman
*Assistant Examiner* — Joel Barnett
(74) *Attorney, Agent, or Firm* — Holtz, Holtz & Volek PC (57) ABSTRACT

A wireless power transmission device includes: a wireless power transmission unit, a power transmission circuit, a wireless communication unit, an interruption circuit, a communication circuit, and a control circuit. The power transmission circuit is connected to the wireless power transmission unit and wirelessly transmits power through the wireless power transmission unit to another party's device. The interruption circuit is connected to the wireless communication unit. The communication circuit is connected through the interruption circuit to the wireless communication unit and communicates with the other party's device via the wireless communication unit. The control circuit is connected to the power transmission circuit and the interruption circuit and, when the power is transmitted, controls the interruption circuit to interrupt between the wireless communication unit and the communication circuit on the basis of a power level transmitted by the power transmission circuit.

8 Claims, 5 Drawing Sheets

(51) Int. Cl.
  *H02H 7/20*   (2006.01)
  *H02J 7/02*   (2016.01)
  *H02J 50/12*  (2016.01)
  *H02J 17/00*  (2006.01)
  *H03H 7/38*   (2006.01)
  *H02J 50/05*  (2016.01)

(52) U.S. Cl.
  CPC .............. *H02J 50/12* (2016.02); *H03H 7/38* (2013.01); *H01F 38/14* (2013.01); *H02J 50/05* (2016.02)

(56) References Cited

U.S. PATENT DOCUMENTS

| | | | | |
|---|---|---|---|---|
| 2011/0278949 | A1* | 11/2011 | Tsai | H02J 7/025 307/104 |
| 2011/0316475 | A1* | 12/2011 | Jung | H02J 7/025 320/108 |
| 2012/0080957 | A1* | 4/2012 | Cooper | H02J 5/005 307/104 |
| 2012/0146574 | A1 | 6/2012 | Ichikawa et al. | |
| 2013/0270924 | A1* | 10/2013 | Mori | H01F 38/14 307/104 |

FOREIGN PATENT DOCUMENTS

| | | |
|---|---|---|
| JP | 2011172299 A | 9/2011 |
| JP | 2012511892 A | 5/2012 |
| JP | 2012530480 A | 11/2012 |
| WO | 2010032309 A1 | 3/2010 |
| WO | 2012090904 A1 | 7/2012 |

OTHER PUBLICATIONS

Japanese Office Action dated Apr. 25, 2013 issued in counterpart Japanese Application No. 2013-067804.

* cited by examiner

WIRELESS POWER TRANSMISSION DEVICE

TECHNICAL FIELD

This invention relates to a device that communicates with the other party's device and transmits power in a wireless manner.

BACKGROUND ART

Devices of this type are disclosed, for example, in Patent Literature 1. Each of the devices of Patent Literature 1 is provided with a coil antenna that is used for both of communication and power transmission. A power transmission system used between devices of Patent Literature 1 is an electromagnetic induction system that transmits power from a coil antenna of a device of a power transmission side to a coil antenna of a device of a power receiving side using magnetic flux as a medium. Especially, a power receiving device of the Patent Literature 1 is provided with an input connection circuit between a coil antenna and a communication circuit. The input connection circuit varies voltage applied to the communication circuit according to voltage occurred on the coil antenna. Thereby, it is prevented to apply overvoltage to the communication circuit at the time of power transmission.

As another wireless power transmission system that uses a coil, a resonance system, which utilizes resonance of circuits including coils, is known for example. Furthermore, a system in which an electrode of a power transmission side and an electrode of a power receiving side are arranged in proximity to each other to execute power transmission therebetween using capacitive coupling is also known (See Patent Literature 2).

CITATION LIST

Patent Literature

[PLT1] Japanese Unexamined Patent Application Publication No. 2011-172299
[PLT2] Japanese Translation of PCT International Application Publication No. 2012-530480

SUMMARY OF INVENTION

Technical Problem

The device of Patent Literature 1 mentioned above has a problem that a signal level is reduced at the time of communication since the input connection circuit works also at the time of the communication.

It is therefore the present invention aims to provide a wireless power transmission device that can protect a communication circuit at the time of power transmission and avoid a reduction of a signal level at the time of the communication.

Solution to Problem

One aspect of the present invention provides a wireless power transmission device that is provided with a wireless power transmission unit, a power transmission circuit, a wireless communication unit, an interruption circuit, a communication circuit and a control circuit. The power transmission circuit is connected to the wireless power transmission unit and executes power transmission with another party's device through the wireless power transmission unit in a noncontact manner. The interruption circuit is connected to the wireless communication unit. The communication circuit is connected to the wireless communication unit through the interruption circuit and executes communication with the other party's device through the wireless communication unit. The control circuit is connected to the power transmission circuit and the interruption circuit and controls the interruption circuit to interrupt between the wireless communication unit and the communication circuit according to a power level transmitted by the power transmission circuit on an occasion of the power transmission.

Advantageous Effects of Invention

As described above, the control circuit according to the one aspect of the present invention controls the interruption circuit to interrupt between the wireless communication unit and the communication circuit, when the power is transmitted, on the basis of the power level transmitted by the power transmission circuit. Hence, the wireless power transmission device according to the one aspect of the present invention does not need a circuit such as the input connection circuit of Patent Literature 1. Therefore, it is possible to protect the communication circuit suitably at the time of the power transmission and avoid the reduction of the signal level at the time of the communication.

By considering the following description of best embodiments with referring to accompanying drawings, the objects of the present invention will be understood certainly and a structure thereof will be understood perfectly.

DESCRIPTION OF EMBODIMENTS

Though the present invention can be realized in diverse modifications and various modes, detailed description will be made in the following about specific embodiments shown in drawings by way of example. The drawings and the embodiments do not limit the present invention into the specific modes disclosed herein while all modified examples, equivalents and alternative examples, which can be made within a range specified by accompanying Claims, are included as its objects.

First Embodiment

A wireless power transmission device according to a first embodiment of the present invention is a power receiving device and is that which executes wireless power transmission and communication with a power transmission device to be the other party's device.

Figure 1:
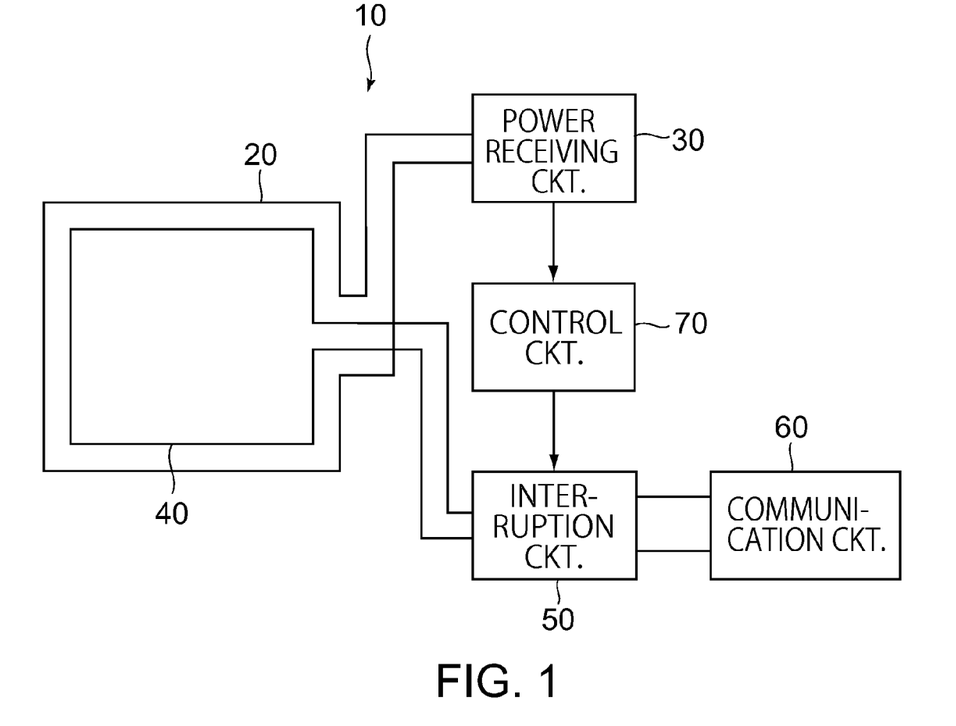
[FIG. 1] A block diagram schematically showing a wireless power transmission device according to a first embodiment of the present invention.

As shown in FIG. 1, a wireless power transmission device 10 is provided with a power transmission antenna (a wireless power transmission unit) 20, a power receiving circuit (a power transmission circuit) 30 connected to the power transmission antenna 20, a communication antenna (a wireless communication unit) 40, an interruption circuit 50 connected to the communication antenna 40, a communication circuit 60 connected to the communication antenna 40 though the interruption circuit 50, and a control circuit 70 connected to the power receiving circuit 30 and the interruption circuit 50.

Though the illustrated power transmission antenna 20 is that which consists of a loop antenna, it may be that which consists of a coil antenna.

The power receiving circuit 30 is that which executes power transmission through the power transmission antenna 20 together with the other party's device (not shown) in a wireless manner. A power transmission system according to the present embodiment is an electromagnetic induction system that transmits power using magnetic flux as a medium between the antenna and an antenna of the other party's device (not shown).

Figure 2:
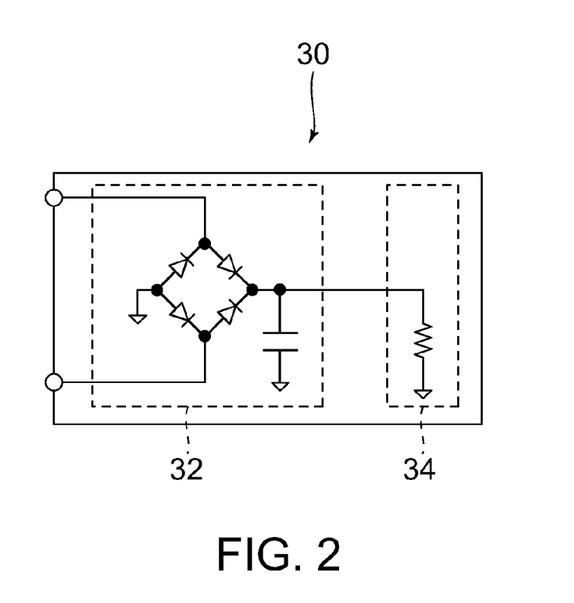
[FIG. 2] A drawing schematically showing a power receiving circuit included in the wireless power transmission device of FIG. 1.

Especially, the illustrated power receiving circuit 30 is that which executes power receiving of power transmitted from the power transmission device (not shown), which is the other party's device, in a wireless manner. The power receiving circuit 30 according to the present embodiment is provided with, as shown in FIG. 2, a rectifying circuit 32 connected to the power transmission antenna 20, and a load unit 34. The illustrated rectifying circuit 32 has a full wave rectifying circuit and a smoothing capacitor. However, the present invention is not limited thereto and various rectifying circuits may be used.

The load unit 34 according to the present embodiment, specifically, consists of a battery body and a protection circuit. Input impedance of the load unit 34 is high when the battery body is in a nearly full charged state or when the protection circuit is working. On the other hand, the input impedance of the load unit 34 is low when the battery body is in nearly empty state and the protection circuit is not working (i.e. in charging). Thus, the input impedance of the load unit 34 according to the present embodiment is varied.

Though the communication antenna 40 is that which consists of a loop antenna as shown in FIG. 1, it may be that which consists of a coil antenna. The communication antenna 40 according to the present embodiment is surrounded by the power transmission antenna 20. In the case of such an arrangement pattern, though space-saving is achieved in a whole of the wireless power transmission device 10, a coupling coefficient between the power antenna 20 and the communication antenna 40 is increased and hence necessity to protect the communication circuit 60 from the power transmission is increased. Even where the power transmission 20 is surrounded by the communication antenna 40 as opposed to the present embodiment, necessity to protect the communication circuit 60 from the power transmission is high for the similar reasons. In these cases, protection of the communication circuit 60 which is described later and made by the control circuit 70 and the interruption circuit 50 according to the present embodiment is particularly effective.

The interruption circuit 50 interrupts between the communication antenna 40 and the communication circuit 60 under control of the control circuit 70 and oppositely cancels the interruption (i.e. connects). The interruption circuit 50, for example, consists of a semiconductor switch or a mechanical switch.

The communication circuit 60 executes communication with the other party's device (not shown) through the communication antenna 40. It should be noted that, on the occasion of the communication, the interruption by the interruption circuit 50 is cancelled as a matter of course. In the present embodiment, a frequency of power of the power transmission and a carrier wave frequency of the communication are different from each other. By differentiating the frequency of the power of the power transmission from the carrier wave frequency of the communication, it is also possible to interrupt AC power accompanied by the power transmission certainly by adding a band-pass filter or a resonant circuit to a system from the communication 40 to the communication circuit 60. However, the present invention is not limited thereto and the frequency of the power of the power transmission and the carrier wave frequency of the communication may be the same in each other.

The control circuit 70 controls the interruption circuit 50 to interrupt between the communication antenna 40 and the communication circuit 60 in the occasion of the power transmission according to a power level received by the power receiving circuit 30 (i.e. a power level transmitted by the power transmission circuit). Specifically, the control circuit 70 according to the present embodiment decides that the power transmission is started according to that a transmitted power level exceeds a prescribed threshold value, and interrupts between the communication 40 and the communication 60 to protect the communication circuit 60 from the transmitted power. Because the control circuit 70 controls the interruption circuit 50 based on the level of the power transmitted in a power transmission system, unlike the case of Patent Literature 1, it is unnecessary to add an unnecessary impedance at the preceding stage of the communication circuit 60. Therefore, according to the present embodiment, it is possible to avoid reduction of the signal level in the communication.

In detail, the control circuit 70 according to the present embodiment is that which conducts hysteresis control. That is, the control circuit 70 controls the interruption circuit 50 to interrupt between the communication antenna 40 and the communication circuit 60 when the level of the transmitted power is more than a first threshold value. On the other hand, the control circuit 70 controls the interruption circuit 50 to cancels the interruption when the level of the transmitted power is lower than a second threshold that is lower than the first threshold value.

Especially, the control circuit 70 according to the present embodiment controls the interruption circuit 50 based on an output of the rectifying circuit 32. Specifically, the control circuit 70 controls the interruption circuit 50 to interrupt between the communication antenna 40 and the communication circuit 60 when the output (a voltage value of rectified power) of the rectifying circuit 32 is more than a first threshold value. On the other hand, the control circuit 70 controls the interruption circuit 50 to cancel the interruption when the output of the rectifying circuit 32 is lower than a second threshold value that is lower than the first threshold value.

In the present embodiment, the first threshold value is decided based on a withstand voltage value of the communication circuit 60 while the second threshold value is decided based on a voltage value supplied to the load unit 34 when impedance of the load unit 34 is the minimum. When setting is made in this manner, the output of the rectifying circuit 32 exceeds the first threshold value at the time of start of power transmission and therefore protection for the communication circuit 60 is started appropriately. Moreover, even though charging for the battery of the load unit 34 is started and the output of the rectifying circuit 32 is temporarily reduced, the interruption by the interruption circuit 50 is continued and the communication circuit 60 is protected continuously. Furthermore, in a case where the power transmission is finished and the communication is started, because the output of the rectifying circuit 32 falls below the second threshold, the interruption by the interruption circuit 50 is cancelled and the communication circuit 60 is connected to the communication antenna 40 and thereby the communication is executed. Thus, according to the present embodiment, it is possible to appropriately protect the communication circuit 60 on the occasion of the power transmission.

It should be noted that the control by the control circuit 70 for the interruption circuit 50 is not limited to above. For example, the control circuit 70 may control the interruption circuit 50 so that the interruption circuit 50 interrupts between the communication antenna 40 and the communication circuit 60 according to a transmitted power level on the occasion of the power transmission and then the interruption circuit 50 cancels the interruption on the occasion of elapse a prescribed period. In the control, the control circuit 70 may measures the prescribed time. Besides, in the present embodiment, the control circuit 70 decides that the power transmission is started when the transmitted power level exceeds the prescribed level and controls the interruption circuit 50 to interrupt between the communication antenna 40 and the communication circuit 60. However, the present invention is not limited thereto. For example, in a case where it is known that the power transmission is started after a lapse of a definite period of time from start of the communication, the control circuit 70 may control the interruption circuit 50 so that the interruption circuit 50 interrupts between the communication antenna 40 and the communication circuit 60 after counting a definite period of time from detecting start of the communication based on a power level.

Second Embodiment

Figure 3:
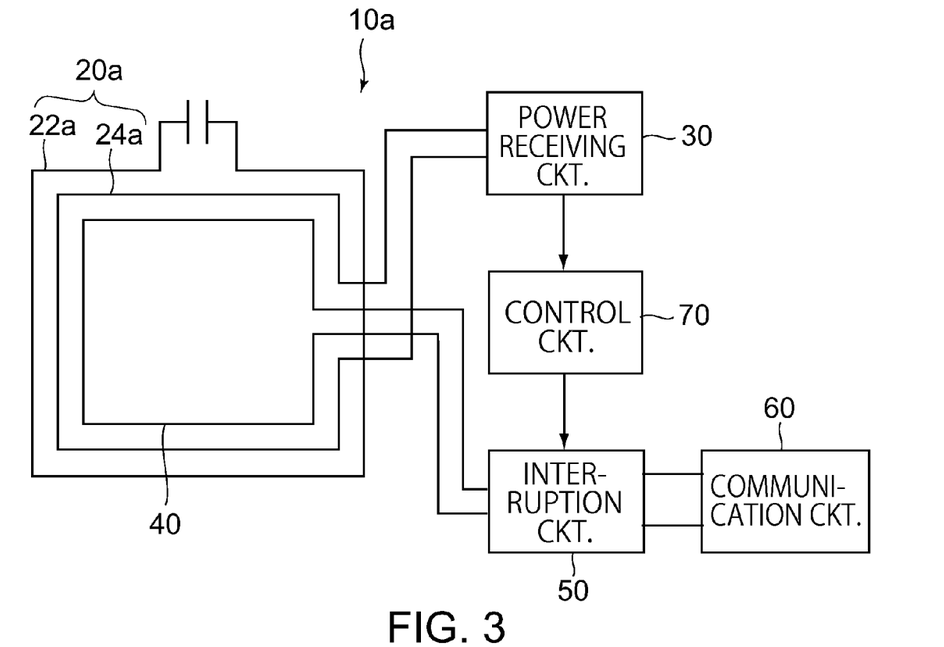
[FIG. 3] A block diagram schematically showing a wireless power transmission device according to a second embodiment of the present invention.

Referring to FIG. 3, a wireless power transmission device 10a according to a second embodiment of the present invention is a modified example of the wireless power transmission device 10 according to the first embodiment mentioned above. In FIG. 3, the same components as the components of FIG. 1 are designated by the same reference numerals and detailed description for their components is omitted.

Though the power transmission system in the first embodiment mentioned above is the electromagnetic induction system, a power transmission system according to the present embodiment is a resonance system which uses a resonance field.

As shown in FIG. 3, a power transmission antenna 20a of a wireless power transmission device 10a according to the present embodiment is provided with a resonance antenna 22a that can resonate with a prescribed frequency to accumulate power and a power transfer antenna 24a for taking out power accumulated in the resonance antenna 22a. The power transfer antenna 24a is connected to a power receiving circuit 30. Other components are similar to those in the case of the first embodiment mentioned above.

Though the illustrated resonance antenna 22a and the power transfer antenna 24a are physically composed with different bodies, the resonance antenna 22a and the power transfer antenna 24a may share a part with each other. Besides, the power transfer antenna 24a may be omitted to take directly the power from the resonance antenna 22a by means of the power receiving circuit 30. Furthermore, resonance may be also performed at a side of the power transfer antenna 24a.

Third Embodiment

Figure 4:
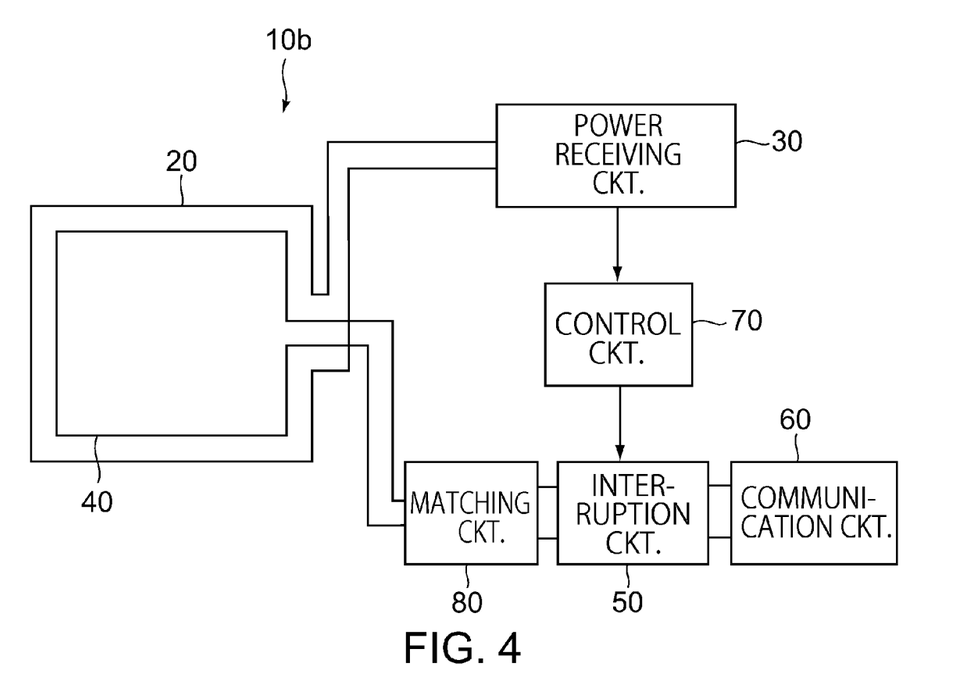
[FIG. 4] A block diagram schematically showing a wireless power transmission device according to a third embodiment of the present invention.

Referring to FIG. 4, a wireless power transmission device 10b according to a third embodiment of the present invention is a modified example of the wireless power transmission device 10 according to the first embodiment mentioned above. In FIG. 4, the same components as the components of FIG. 1 are designated by the same reference numerals and detailed description for their components is omitted.

The wireless power transmission device 10b according to the present embodiment is further provided with a matching circuit 80 that connected between the communication antenna 40 and the interruption circuit 50 to match impedance of the communication antenna 40 with that of the communication circuit 60.

In other words, the interruption circuit 50 according to the present embodiment is disposed between the matching circuit 80 and the communication circuit 60. With such an arrangement, it is possible to give a margin to withstand voltage characteristics because a signal passing through the matching circuit 80 is suppressed in voltage width.

Fourth Embodiment

Figure 5:
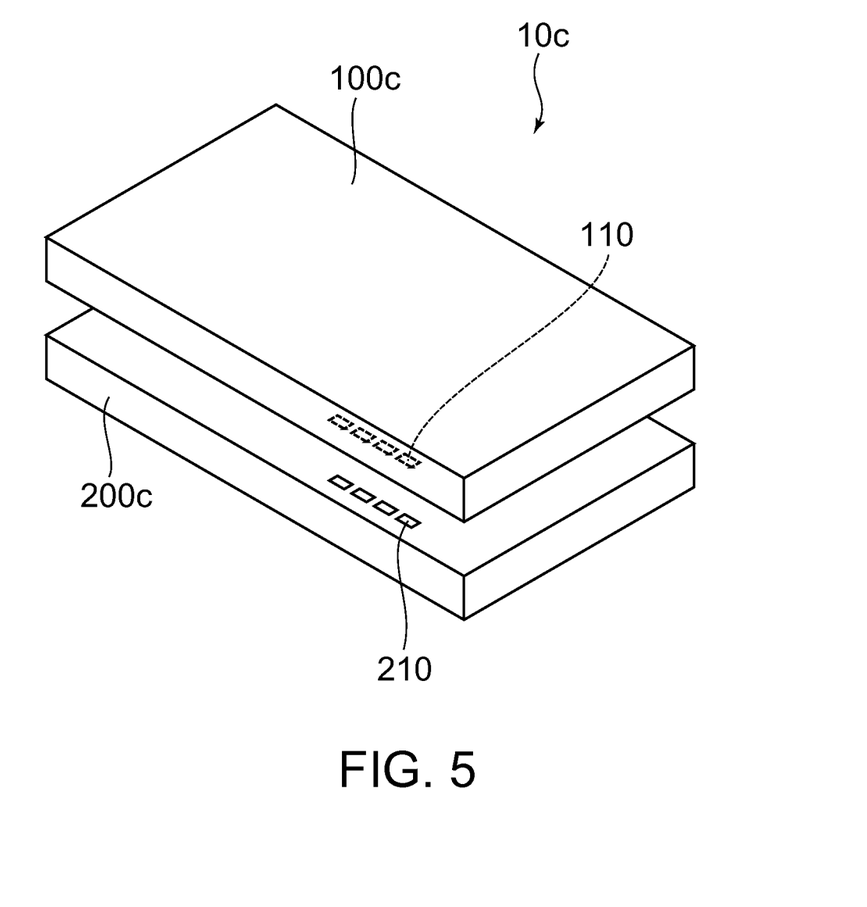
[FIG. 5] A drawing schematically showing a wireless power transmission device according to a fourth embodiment of the present invention.

In FIG. 5, an applied example of the wireless power transmission device according to above mentioned embodiments is shown. Referring to FIG. 5, a wireless power transmission device 10c according to the present embodiment is provided with a portable electronic device 100c and a power transmission module 200c. The portable electronic device 100c is provided with a device side connection terminal 110 that consists of contacts while the power transmission module 200c is provided with a module side connection terminal 210 that consists of contacts. In the wireless power transmission device 10c according to the present invention, the device side connection terminals 110 and the module side connection terminals 210 are connected mutually by mounting the portable electronic device 100c on the power transmission module 200c. It should be noted that a connection form between the portable electronic device 100c and the electronic power transmission module 200c is not limited in this example. For example, the device side connection terminal 110 and the module side connection module 210 may be connectors and they may be connected with a cable.

In the portable electronic device 100c, at least the load unit 34 of components of the wireless power transmission devices according to the above mentioned embodiments is provided. On the other hand, in the power transmission module 200c, at least the power transmission antenna (wireless power transmission unit) 20 and the power receiving circuit (power transmission circuit) 30 (especially, the rectifying circuit 32) of the components of the wireless power transmission devices according to the above mentioned embodiments are provided. Hereby, it is possible to add a wireless charging function to a portable electronic device 100c that does not have the wireless charging function.

Figure 6:
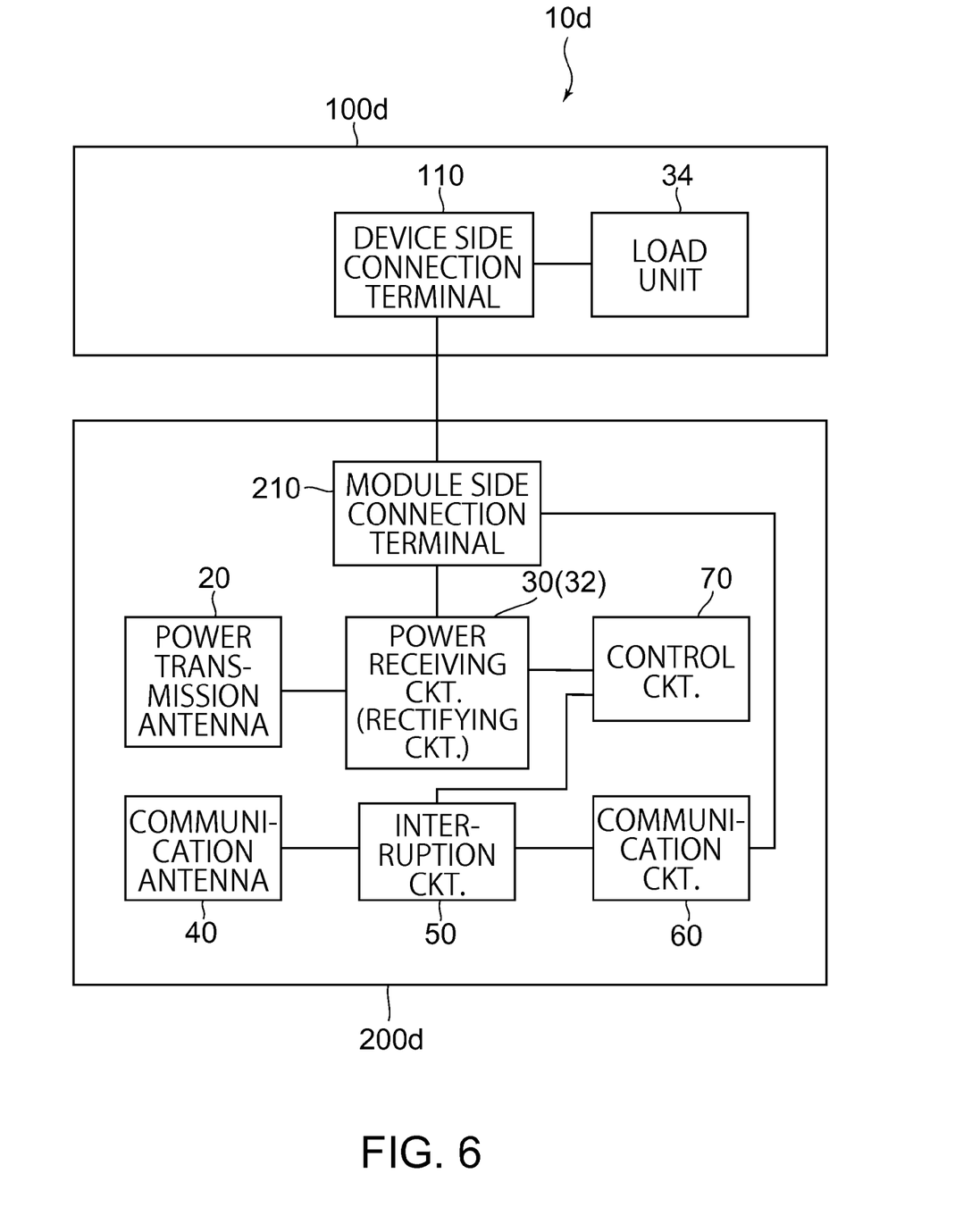
[FIG. 6] A block diagram schematically showing an example of the wireless power transmission device of FIG. 5.
Figure 7:
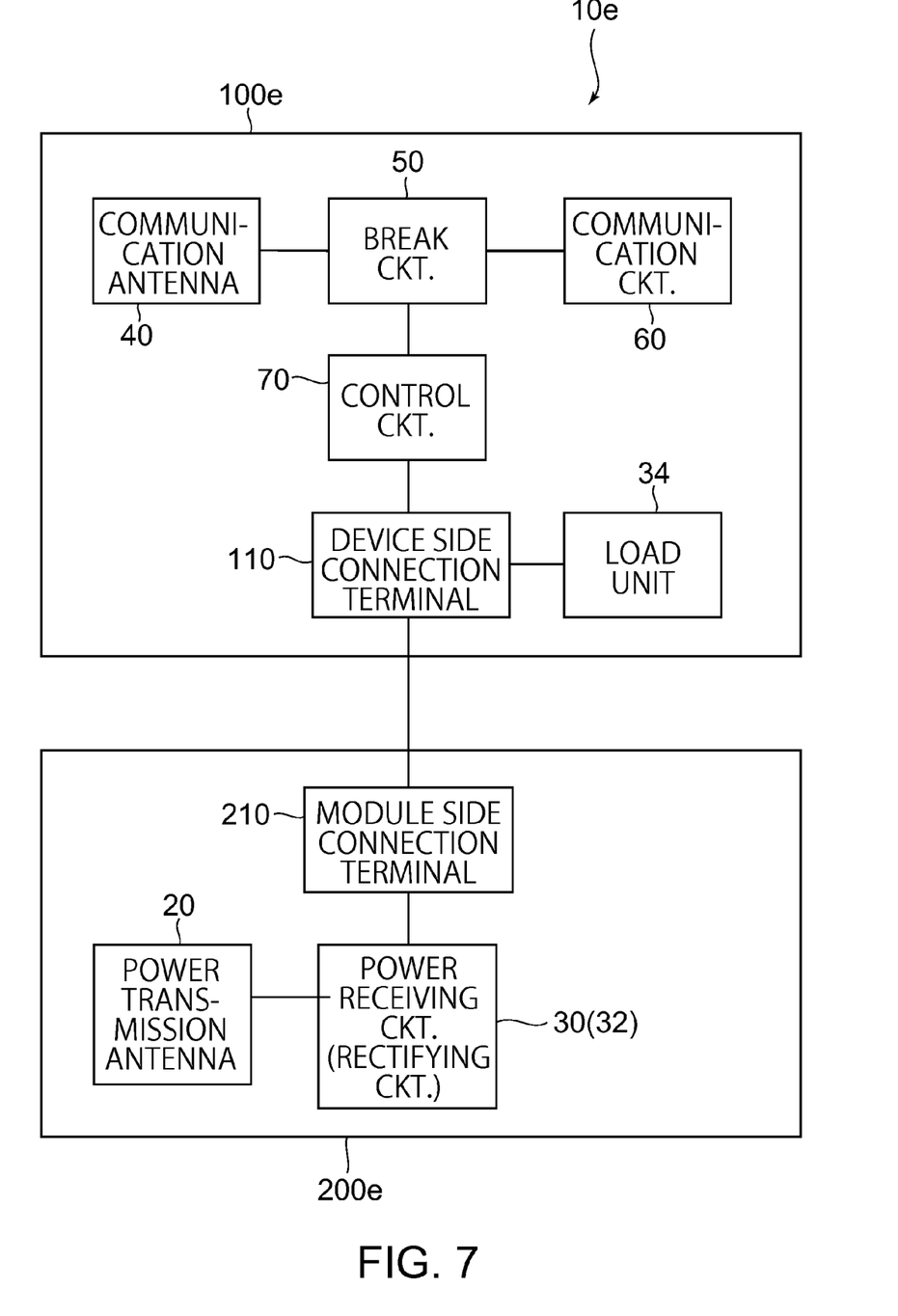
[FIG. 7] A block diagram schematically showing a modified example of the wireless power transmission device of FIG. 6.

An example in which the components of the wireless power transmission device 10 according to the above mentioned first embodiment is applied to the wireless power transmission device 10c according to the above mentioned fourth embodiment will be further described more concretely using FIGS. 6 and 7.

In a wireless power transmission device 10d, only the load unit 34 of the components of the wireless power transmission device 10 according to the first embodiment is provided in a portable electronic device 100d while the other components are provided in a power transmission module 200d. In detail, in the portable electronic device 100d, the load unit 34 is connected to the device side connection terminal 110. A power transmission module 200d is provided with the power transmission antenna 20, the power receiving circuit 30 (the rectifying circuit 32), the communication antenna 40, the interruption circuit 50, the communication circuit 60, the control circuit 70 and the module side connection terminal 210 while the power receiving circuit 30 (the rectifying circuit 32) and the communication circuit 60 are connected to the module side connection terminal 210. Especially, in the case of this example, it is possible to add a wireless charge function to a conventional cellphone without modifying the conventional cellphone, for example.

In a wireless power transmission device 10e shown in FIG. 7, only the power transmission antenna 20 and the power receiving circuit 30 (the rectifying circuit 32) of the components of the wireless power transmission device 10 according to the first embodiment is provided in a power transmission module 200e while the other components are provided in a portable electronic device 100e. In detail, in the power transmission module 200e, the power circuit 30 (the rectifying circuit 32) is connected to the module side connection terminal 210. The portable electronic device 100e is provided with the load unit 34, the communication antenna 40, the interruption circuit 50, the communication circuit 60 and control circuit 70 while the load unit 34 and the control circuit 70 are connected to the device side connection terminal 110. Especially, in the case of this example, it is possible to protect the communication circuit 60 certainly because the communication antenna 40 is disposed away from the other party's device in comparison with the power transmission antenna 20.

Modifications other than examples illustrated in FIGS. 6 and 7 are possible. For example, in the wireless power transmission device 10d, only the communication circuit 60 may be displaced to a side of the portable electronic device 100d to connect the communication circuit 60 with the device side connection terminal 110 and connect the interruption circuit 50 with the module side connection terminal 210. In this case, a line connecting the power receiving circuit 30 with the load unit 34 and a line connecting the interruption circuit 50 and the communication circuit 60 are independent from each other. Furthermore, in the wireless power transmission device 10e shown in FIG. 7, only the control circuit 70 may be displaced to a side of the power transmission module 200e to connect the power receiving circuit 30 with the control circuit 70 and connect the control circuit 70 with the module side connection terminal 210 and connect the interruption circuit 50 with the device side connection terminal 110.

It should be noted that though the fourth embodiment is that which bases on the wireless power transmission device 10 according to the first embodiment, the present invention is not limited thereto. The wireless power transmission devices 10a and 10b according to the second and the third embodiments may be divided and put in the portable electronic device and the power transmission module as the fourth embodiment mentioned above.

Though the present invention has been described concretely with citing a plurality of embodiments, the present invention is not limited thereto and may be applied and modified.

For example, though the load unit 34 according to the embodiments mentioned above consists of the battery body and the protection circuit, the present invention is not limited thereto and it is applicable in a case of another load.

Furthermore, though the power transmission method in the embodiments mentioned above is the electromagnetic induction method or the resonance method, it may be a field coupling method or a capacitive coupling method. In such a case, the above mentioned wireless power transmission unit 20 and the above mentioned wireless communication unit 40 would be electrodes.

Moreover, though the power receiving device is the wireless power transmission device while the power transmission device is the other party's device in the above mentioned embodiments, the present invention is not limited thereto. Because it is necessary to protect a communication circuit from large power at a time of power transmission in a side of the power transmission device, a structure regarding protection for the communication circuit may be adapted in the side of the power transmission circuit in a case where it is not specified function or structure for the power receiving device. In such a case, that corresponding to the power receiving circuit in the power receiving device would be a power transmission circuit in the power transmission device. Accordingly, the control circuit would control the interruption circuit based on a power level transmitted by the power transmission circuit.

The present invention is based on Japanese Patent Application No. 2013-067804 filed on Mar. 28, 2013, and the contents of which forms a part of the present specification by reference.

While the best embodiments of the present invention have been described, as it is apparent to those skilled in the art, the embodiments are possible to be modified within a scope that is not departing from the spirit of the present invention, and such embodiments belong to the scope of the present invention.

REFERENCE SIGNS LIST

10, 10a, 10b, 10c, 10d, 10e wireless power transmission device
20, 20a power transmission antenna (wireless power transmission unit)
22a resonance antenna
24a power transferring antenna
30 power receiving circuit (power transmission circuit)
32 rectifying circuit
34 load unit
40 communication antenna (wireless communication unit)
50 interruption circuit 60 communication circuit
70 control circuit
80 matching circuit
100ci, 100d, 100e portable electronic device
110 device side connection terminal
200c, 200de, 200e power transmission module
210 module side connection terminal

The invention claimed is:

1. A wireless power receiving device comprising:
a wireless power receiving unit that comprises an antenna or an electrode to receive power in a wireless manner;
a power receiving circuit that is connected to the wireless power receiving unit and receives power transmitted from a power transmission device through the wireless power receiving unit in the wireless manner;
a wireless communication unit that comprises a communication antenna;
an interruption circuit that is connected to the wireless communication unit;
a communication circuit that is connected to the wireless communication unit through the interruption circuit and executes communication with the power transmission device through the wireless communication unit; and
a control circuit that is connected to the power receiving circuit and the interruption circuit and controls the interruption circuit to interrupt between the wireless communication unit and the communication circuit according to a power level received by the power receiving circuit on an occasion of the power receiving;
wherein:
the power receiving circuit comprises a rectifying circuit that rectifies power received through the wireless power receiving unit, and a load unit that receives rectified power from the rectifying circuit;
the control circuit controls the interruption circuit to interrupt between the wireless communication unit and the communication circuit when a voltage value of the rectified power is more than a first threshold value, and controls the interruption circuit to cancel the interruption when the voltage value of the rectified power is lower than a second threshold value that is lower than the first threshold value;
the load unit has a variable impedance;
the first threshold value is based on a withstand voltage value of the communication circuit; and
the second threshold value is based on a voltage value supplied to the load unit when the impedance of the load unit is equal to a minimum value.

2. The wireless power receiving device as recited in claim 1, comprising a portable electronic device and a power receiving module, wherein:
the portable electronic device is provided with at least a device side connection terminal;
at least the load unit is provided in the portable electronic device;
the power receiving module is provided with at least a module side connection terminal;
at least the wireless power receiving unit and the power receiving circuit are provided in the power receiving module; and
the load unit and the power receiving circuit are connected to each other through the device side connection terminal and the module side connection terminal.

3. The wireless power receiving device as recited in claim 1, further comprising a matching circuit that is connected between the wireless communication unit and the interruption circuit and executes impedance matching.

4. The wireless power receiving device as recited in claim 1, wherein:
the wireless power receiving unit comprises a power receiving antenna consisting of a loop antenna or a coil antenna, and
the communication antenna consists of a loop antenna or a coil antenna.

5. The wireless power receiving device as recited in claim 4, wherein one of the power receiving antenna and the communication antenna is provided to surround the other.

6. The wireless power receiving device as recited in claim 4, wherein the power receiving antenna comprises a resonance antenna that executes power receiving with the power transmission device through a resonance field.

7. The wireless power receiving device as recited in claim 6, wherein the power receiving antenna further comprises a power transferring antenna used for transferring power between the resonance antenna and the power receiving circuit.

8. The wireless power receiving device as recited in claim 1, wherein a frequency of a power of the power receiving and a carrier wave frequency of the communication are different from each other.

* * * * *